United States Patent Office 3,290,381
Patented Dec. 6, 1966

---

3,290,381
SULFUR CONTAINING POLYFORMALS AND METHOD OF MAKING SAME
Henry F. Lederle, North Haven, Conn., assignor to Olin Mathieson Chemical Corporation, a corporation of Virginia
No Drawing. Filed Oct. 10, 1963, Ser. No. 315,340
4 Claims. (Cl. 260—609)

This invention relates to a high viscosity lubricant comprised of sulfur-containing polyformals and to a method for their preparation. More specifically, this invention relates to reacting at least one mercaptoalkanol with formaldehyde to obtain a sulfur-bearing high viscosity polyformal. The sulfur-containing high viscosity polyformals are suitable for use as the lubricant portion of central power system fluids.

Attempts to prepare polyformals in the past from mercaptoalkanols and paraformaldehyde generally have resulted in low yields of the desired linear polymer because of the formation of cyclic sulfur-containing ethers. However, it has surprisingly been discovered that a satisfactory yield of linear polymer can be obtained using very low concentrations of paratoluenesulfonic acid rather than the boron trifluoride ether catalyst which is conventionally used. Catalyst concentration must be kept low to avoid the formation of cyclic byproducts. In practicing the process of this invention, from about 0.001 to about 0.5 gram of paratoluenesulfonic acid per mole of the mercaptoalkanol charged to the reactor will be utilized and preferably the quantity of paratoluenesulfonic acid utilized will be from about 0.01 to about 0.1 gram per mole of mercaptoalkanol used.

Mercaptoalkanols of the formula:

OH—R—SH wherein R is an alkylene radical containing from 2 to 6 carbon atoms, are useful as starting materials in the process of this invention. Suitable alkanols include, for example, 2-mercaptoethanol, 3-mercaptopropanol, 2-mercaptoisopropanol, 2-mercapto-t-butanol, 4-mercaptobutanol, and 6-mercaptohexanol. Mixtures of mercaptoalkanols can be utilized if desired.

The quantity of paraformaldehyde employed in the novel process of this invention can be varied widely from about 0.60 to about 1.75 moles per mole of the mercaptoalkanol employed. Preferably, the amount of paraformaldehyde will be from about 0.70 to about 1.30 moles per mole of the mercaptoalkanol introduced. Paraformaldehyde and formaldehyde are equivalent in the practicing of this invention. Instead of the paraformaldehyde of the above examples, trioxane, methylal, aqueous formalin and similar formaldehyde-generating compounds may be used. Instead of formaldehyde, other reactive aldehydes, such as acetaldehyde, propanal, butanal, glyoxal, and other dialdehydes, containing not more than 8 carbon atoms in the monomeric form, and mixtures thereof, may be used in forming water-soluble or water-dispersible condensation products.

The temperature of reaction ranges from 50° C. to 200° C. Although atmospheric pressure reactions are convenient, pressures from subatmospheric to +5 atmospheres or more can be employed. Depending upon the reaction conditions employed, the reaction time will range from about 3 to about 12 hours.

A central hydraulic system is analogous to the automotive electrical system in that it is capable of operating a multiplicity of devices from one central power system. A central hydraulic system consists of a pump, an accumulator, and a reservoir. Items which can be actuated from the central power system are brakes, steering gear, windshield wipers, window lifts, adjustable seats, convertible tops, starters, transmissions, fuel pumps, injection equipment, air conditioning, and suspension leveling systems.

The most rigorous requirement of a central hydraulic fluid is viscosity, since the fluid must be equivalent to automatic transmission fluids at high temperatures, and yet must meet the low temperature requirements of a brake fluid. If it exhibits too low a viscosity, an impaired power steering can result; and the lack of lubricity is indicated by excessive wear of the power steering pump. Central system fluids must tolerate relatively high temperatures, above ambient temperature, and they must dissipate heat without producing varnish, gum, or sludge, or other products of deterioration that might impair the proper functioning of the system. Heretofore, no fluid has passed all the requirements.

Hydraulic fluids, in general, are comprised of at least three components: lubricants, solvents, and inhibitors. Adequate solvents and inhibitors are commercially available. This invention of a lubricant with greatly improved properties solves the heretofore unsolved problem of obtaining a universally applicable fluid for central systems.

It has unexpectedly been determined that high viscosity products suitable for use as the lubricant portion of central power system fluids are easily obtained from sulfur-containing compounds such as 2-mercapto-ethanol by reaction with paraformaldehyde if low concentrations of paratoluenesulfonic acid are used as a catalyst. The sulfur atom in the molecule contributes materially to the lubricity and to the oxidation resistance of the polymer.

Specific examples include:

*Example I*

A mixture of 2 moles of 2-mercapto-ethanol, 1.74 moles of 91% paraformaldehyde, 0.085 gram of paratoluenesulfonic acid and 100 ml. of benzene was charged into a 500 ml. three-necked flask fitted with a thermometer, an azeotrope trap, and a condenser. A magnetic stirrer is used to stir this solution. After azeotroping and stirring for five hours, the catalyst was neutralized with 40 ml. of a 10% aqueous lime suspension. The product was stripped to 110° C. pot temperature at atmospheric pressure followed by 145° C. at water aspirator pressure, and then filtered. The yield was approximately quantitative. The kinematic viscosity at 100° F. was 326.0 cs., at 210° F. it was 24.2 cs. (ASTM slope, was 0.64).

*Example II*

A 500 ml. three-necked flask was fitted with a thermometer, an azeotrope trap, and a condenser. The flask was charged with 2-mercapto-ethanol (2 moles), 91% paraformaldehyde (2.5 moles), 100 ml. of benzene and 0.085 g. of paratoluenesulfonic acid. A magnetic stirrer was used for stirring. After azeotroping and stirring for five hours, the catalyst was neutralized with 40 ml. of a 10% aqueous lime suspension. The product was stripped to 110° C. at atmospheric pressure, then to 145° C. at water aspirator pressure and then filtered. The yield of the product was nearly quantitative. The kinematic viscosity at 100° F. was 2475 cs., at 210° F. it was 145.2 cs. (ASTM slope, was 0.35).

What is claimed is:
1. A method of preparing a high viscosity sulfur-containing polyformal which comprises reacting a mercaptoalkanol of the formula:

HO—R—SH wherein R is an alkylene radical containing from 2 to 6 carbon atoms, with paraformaldehyde at a temperature of from about 50° C. to 200° C. and in the presence of about 0.001 to about 0.5 gram of paratoluenesulfonic acid per mole of the said mercaptoalkanol, the quantity of paraformaldehyde employed being from about 0.60 to about 1.75 moles per mole of the mercaptoalkanol, and the reaction being conducted over a period of time ranging from about 3 to about 12 hours.

2. The method of claim 1 in which the mercaptoalkanol has the formula:

$$HO-R-SH$$

wherein R is an alkylene group having from 2 to 6 carbon atoms.

3. The method of claim 2 in which the mercaptoalkanol is 2-mercaptoethanol.

4. The product produced in claim 1.

References Cited by the Examiner
UNITED STATES PATENTS

2,295,760   9/1942   Schreiber _____ 260—609

CHARLES B. PARKER, *Primary Examiner.*

D. R. PHILLIPS, *Assistant Examiner.*